3,745,189
PROCESS FOR THE CONTINUOUS PRODUCTION OF PSEUDOIONONES
Werner Hoffmann, Heinrich Pasedach, and Roman Fischer, Ludwigshafen, Germany, assignors to Badische Anilin- & Soda-Fabrik Aktiengesellschaft, Ludwigshafen (Rhine), Germany
No Drawing. Filed Sept. 15, 1969, Ser. No. 858,178
Claims priority, application Germany, Sept. 18, 1968, P 17 93 445.1
Int. Cl. C07c 49/20, 49/24
U.S. Cl. 260—593 R       5 Claims

ABSTRACT OF THE DISCLOSURE

Production of pseudoionones having the general formula: $CH_3-C(CH_3)=CR^2-A$;

$$CH_2=C(CH_3)-CHR^2-A$$

and $R^3OC(CH_3)_2-CHR^2-A$ by reaction of dehydrolinalools $CH_3-C(CH_3)=CR^2-B$;

$$CH=C(CH_3)-CHR^2-B$$

and $R^3OC(CH_3)_2-CHR^2-B$ with an acetoacetic ester $CH_3-CO-CHR^1-COOR^3$ (with A denoting $$-CH_2-CH_2-C(CH_3)=CH-CH=CHR^1-CO-CH_3;$$

B denoting $-CH_2-CH_2-C(CH_3)(OH)-C=CH$; $R^1$ and $R^2$ denoting H or $CH_3$; and $R^3$ denoting an alkyl group) by continuous reaction in at least two vessels arranged in series, the residence times in the vessels being about equal and the reaction temperatures rising in each case by from 1° to 50° C. from vessel to vessel, the temperature in the first vessel being from 160° to 190° C.

The products are valuable perfumes and intermediates for the synthesis of compounds of the vitamin-A and carotenoid series.

---

The present invention relates to a new continuous process for the production of pseudoionones having the general Formula Ia, Ib and Ic:

(Ia)      (Ib)      (Ic)

in which $R^1$ and $R^2$ denote hydrogen atoms or methyl groups, and $R^3$ denotes an alkyl group having from one to four carbon atoms, starting from dehydrolinalools having the general Formulae IIa, IIb and IIc;

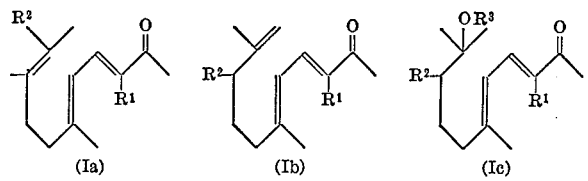
(IIa)      (IIb)      (IIc)

and an acetoacetic ester having the general Formula III:

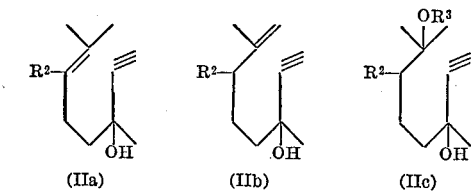

$$CH_3CO-CH-COOR^3$$
$$\phantom{CH_3CO-}R^1 \qquad (III)$$

The continuous reaction of the compounds (IIa), (IIb) and (IIc) with (III) to form the compounds (Ia), (Ib) and (Ic) at temperatures of from 100° to 400° C. in the presence or absence of catalytic amounts of a weak acid is generally known. However, contaminants which are difficult to remove form in addition to the desired compounds. Moreover, the space-time yields are so low that they do not meet the requirements placed on industrial processes.

We have now found that the production of pseudoionones (Ia), (Ib) and (Ic) by reacting a dehydrolinalool (IIa), (IIb) or (IIc) at from 150° to 300° C. with an acetoacetic ester (III) can be carried out in a very economical and advanced continuous manner by effecting the reaction in at least two reactors arranged in series, the temperature in the first reactor being from 160° to 190° C. and the temperatures in the subsequent reactor(s) being in each case from 1° to 50° C. higher than in the preceding reactor, the residence times of the reaction material in the reactors being equal or substantially equal and between ten minutes and five hours.

The starting compounds (IIa), (IIb) and (IIc) are known and can be obtained for example by ethynylation of the appropriate ketones.

Alkyl esters of acetoacetic acid having from one to four carbon atoms in the alkyl radical are suitable as the acetoacetic esters (III), preferably the methyl and ethyl esters.

The starting compounds react together stoichiometrically, but it is advisable to use the acetoacetic ester in an excess of up to four times the molar amount in order to achieve more rapid conversion.

The reaction may be carried out with or without a catalyst and/or a solvent. Weak acids, such as adipic caid, benzoic acid, terephthalic acid and stearic acid, are suitable as catalysts in amounts of from 0.1 to 10% by weight with reference to the whole of the reaction mixture. Examples of suitable solvents are aliphatic, cycloaliphatic or aromatic hydrocarbons or ethers having boiling points above 150° C. as well as aprotic solvents, such as dimethylformamide and N-methylpyrrolidone. The amount of these solvents is generally from 0.1 to ten times that of the reactants.

Stirred vessels, re-circulating evaporators and columns of various designs are suitable as a cascade of reactors. The number of reactors in a cascade is preferably from two to six.

It is usual to carry out the reaction at atmospheric pressure, but it may be generally carried out at a pressure of from 100 mm. Hg to a 3 atmospheres. During the reaction, not only is carbon dioxide eliminated but also alcohol which is advantageously removed from the equilibrium mixture by distillation.

The product may be worked up conventionally by distillation. Optimal yields of pseudoionones are obtained at a conversion of from 75 to 90%, the yields being 70 to 90% with reference to the amount of dehydrolinalool reacted.

The product obtained by the new process are valuable perfumes and intermediates for the synthesis of compounds of the vitamin-A and carotenoid series.

The invention is illustrated by the following examples.

EXAMPLE 1

Four glass flasks each provided with a distillation head and having a capacity of 250 ml., the reaction chamber of each flask being limited to 150 ml. by an overflow, are arranged in series.

A solution of 116 g. of 3.7-dimethyl-7-octen-1-in-3-ol, 177 g. of methyl acetoacetate and 2 g. of adipic acid is introduced continuously per hour into this apparatus. The reaction temperature is adjusted to 180° C. in the first reactor and to 185° C., 190° C. and 195° C. in the subsequent reactors. The residence time is thirty minutes per reactor. The reflux-discharge ratio is so adjusted at the distillation heads that only methanol distils off.

The amounts of methanol and carbon dioxide obtained per hour from the four reactors are as follows:

| Reactor No. | 1 | 2 | 3 | 4 |
|---|---|---|---|---|
| Methanol (g.) | 15 | 7 | 4 | 3 |
| Carbon dioxide (l.) | 4 | 5 | 4 | 3 |

About 240 g. of reaction mixture is obtained per hour. 6,10-dimethyl-3,5,10-undecatrien-2-one is obtained therefrom by distilaltion in an 86% yield.

EXAMPLE 2

6,10-dimethyl-10-methoxy-3,5-undecadien-2-one is obtained in an 84% yield from an hourly supply of 133 g. of 3,7-dimethyl-7-methoxy-1-octyn-3-ol, 167 g. of methyl acetoacetate and 2 g. of benzoic acid in the manner described in Example 1.

What we claim is:
1. In a process for the continuous production of pseudoionones having the Formulae Ia, Ib and Ic:

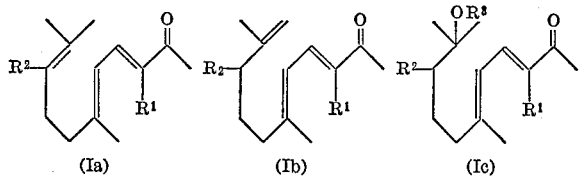

in which $R^1$ and $R^2$ denotes hydrogen atoms or methyl groups and $R^3$ denotes an alkyl group having from one to four carbon atoms, starting from a dehydrolinool having the Formula IIa, IIb or IIc:

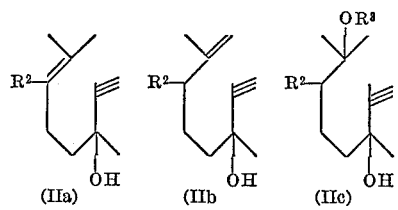

and an ester of acetoacetic acid having the general Formula III:

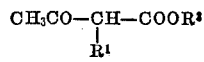

the improvement which comprises continuously carrying out the reaction in a four stage reactor system, the temperature in the following reactors being in each case 50° C. higher than in the preceding reactor and the residence times of the reaction material in the reactors being equal or substantially equal and between ten minutes and five hours.

2. A process as claimed in claim 1 carried out in the presence of a week acid catalyst selected from the group consisting of adipic acid, benzoic acid, terephthalic acid and stearic acid.

3. A process as claimed in claim 1 carried out in a solvent.

4. A process as claimed in claim 1 wherein the alcohol eliminated during the reaction is distilled off.

5. A process as claimed in claim 3 wherein said solvent is an organic liquid with a boiling point above 150° C. and selected from the group consisting of hydrocarbons, ethers, dimethylformamide and N-methylpyrrolidone.

References Cited
FOREIGN PATENTS
1,026,743   3/1958   Germany _____ 260—593 R

OTHER REFERENCES

Hougen: Chemical Process Principles, Part 3, Kinetics and Catalysis, John Wiley & Sons, New York, N.Y., pp. 1031–1033, 1947.

DANIEL D. HORWITZ, Primary Examiner

U.S. Cl. X.R.
260—594; 252—522

PO-1050
(5/69)

UNITED STATES PATENT OFFICE
CERTIFICATE OF CORRECTION

Patent No. 3,745,189            Dated July 10, 1973

Inventor(s) Werner Hoffmann, Heinrich Pasedach, and Roman Fischer

It is certified that error appears in the above-identified patent and that said Letters Patent are hereby corrected as shown below:

Column 2, line 30, "caid" should read -- acid --; line 32, ".1 to 10%" should read -- .01 to 10% --.

Column 3, line 40, "(IIb" should read -- (IIb) --.

Column 4, line 8, "system, the temperature" should read -- system, the temperature in the first reactor being from 160° to 190° C. and the temperature --; line 9, "50° C." should read -- about 5° C. --.

Signed and sealed this 20th day of November 1973.

(SEAL)
Attest:

EDWARD M. FLETCHER, JR.
Attesting Officer

RENE D. TEGTMEYER
Acting Commissioner of Patents